US006803698B2

United States Patent
Tabota

(10) Patent No.: US 6,803,698 B2
(45) Date of Patent: Oct. 12, 2004

(54) ACCELERATION SENSOR

(75) Inventor: Jun Tabota, Toyama-ken (JP)

(73) Assignee: Murata Manufacturing Co., LTD, Kyoto (JP)

( * ) Notice: Subject to any disclaimer, the term of this patent is extended or adjusted under 35 U.S.C. 154(b) by 0 days.

(21) Appl. No.: 09/973,600

(22) Filed: Oct. 9, 2001

(65) Prior Publication Data

US 2002/0125792 A1 Sep. 12, 2002

(30) Foreign Application Priority Data

Oct. 12, 2000 (JP) .......................................... 2000-311510

(51) Int. Cl.[7] ............................ H03H 9/25; G01P 15/09
(52) U.S. Cl. ............................... 310/313 R; 310/313 B; 73/510; 73/514.28
(58) Field of Search .................... 310/313 R, 313 B; 73/510, 514.28

(56) References Cited

U.S. PATENT DOCUMENTS

| 3,848,144 | A | * | 11/1974 | Schissler | ................. | 310/313 B |
| 3,858,064 | A | * | 12/1974 | Schissler | ................. | 310/313 B |
| 3,863,497 | A | * | 2/1975 | van de Vaart et al. | ......... | 73/654 |
| 4,193,045 | A | * | 3/1980 | Houkawa et al. | ........ | 331/107 A |
| 4,346,597 | A | * | 8/1982 | Cullen | ......................... | 73/510 |
| 4,535,631 | A | * | 8/1985 | Sinha et al. | ................... | 73/703 |
| 4,621,530 | A | * | 11/1986 | Dwyer et al. | ............. | 73/514.28 |
| 6,445,265 | B1 | * | 9/2002 | Wright | ......................... | 333/193 |

FOREIGN PATENT DOCUMENTS

| GB | 2117115 | A | * | 10/1983 | ............ G01P/15/08 |
| GB | 2123554 | A | * | 2/1984 | ............... 73/514.28 |
| JP | 59-057166 | | | 4/1984 | ............ G01P/15/09 |
| JP | 62-103321 | | | 7/1987 | ............. H03H/9/25 |
| JP | 8-166302 | | * | 6/1996 | .............. G01L/9/00 |
| JP | 9-33560 | | | 2/1997 | ............ G01P/15/09 |
| JP | 9-55638 | | | 2/1997 | ............. H03H/9/17 |
| JP | 9-243656 | | | 2/1997 | ............ G01P/15/09 |
| JP | 9-181562 | | | 7/1997 | ............. H03H/9/25 |
| JP | 9-229950 | | | 9/1997 | ............ G01P/15/09 |
| JP | 9-321564 | | | 12/1997 | ............. H03H/3/08 |
| JP | 1-196906 | | * | 8/1999 | .................. 333/193 |
| JP | 2-228530 | | | 9/1999 | .............. G01L/9/25 |

* cited by examiner

Primary Examiner—Thomas M. Dougherty
(74) Attorney, Agent, or Firm—Keating & Bennett, LLP

(57) ABSTRACT

An acceleration sensor including a bimorph type acceleration detection element including a pair of surface acoustic wave resonators laminated to each other with the back surface of one resonator bonded to the back surface the other resonator. Each resonator includes a piezoelectric substrate and a pair of IDT electrodes which are arranged on the front surface of the piezoelectric substrate. The acceleration detection element is supported at the end thereof so that the acceleration detection element is deflected in the direction of thickness under acceleration. Acceleration is detected by detecting a difference between frequency changes of the two surface acoustic wave resonators or a difference between impedance changes of the two surface acoustic wave resonators, which takes place under acceleration.

6 Claims, 8 Drawing Sheets

ACCELERATION SENSOR

BACKGROUND OF THE INVENTION

1. Field of the Invention

The present invention relates to acceleration sensors and, more particularly, to an acceleration sensor using a surface acoustic wave device (SAW device).

2. Description of the Related Art

Japanese Examined Patent Application Publication No. 4-79419 discloses an acceleration sensor using an SAW device. This acceleration sensor includes a surface acoustic wave device having interdigital (IDT) electrodes arranged on the surfaces of a piezoelectric substrate, and employs, as a means for applying a load on the device under acceleration, a four-point support system which is supported at both ends thereof with an acceleration generating mass attached near the ends thereof.

The surface acoustic wave device is supported at both ends in a case. However, when the case and the surface acoustic device are thermally expanded, stress is generated in the surface acoustic device due to a difference between thermal expansion coefficients thereof. The resonance frequency of the surface acoustic wave device is varied in response to factors other than acceleration, for example, a change in the characteristics of the surface acoustic wave device due to a change in the temperature of the surface acoustic wave device itself. These factors present difficulty in detecting acceleration with sufficient accuracy.

SUMMARY OF THE INVENTION

Accordingly, it is an object of the present invention to provide a high-accuracy acceleration sensor free from factors such as temperature changes, except acceleration.

The present invention relates to an acceleration sensor and includes a bimorph type acceleration detection element including a pair of surface acoustic wave resonators coupled to each other with the back surface of one resonator bonded to the back surface of the other resonator. Each resonator includes a piezoelectric substrate and a pair of IDT electrodes which are arranged on the front surface of the piezoelectric substrate. The acceleration detection element is supported at an end thereof such that the acceleration detection element is deflected in the thickness direction of the piezoelectric substrate under acceleration. Acceleration is detected by differentially detecting a frequency change or an impedance change of said two surface acoustic wave resonators which is caused by the deflection of the acceleration detection element.

The acceleration sensor has a bimorph structure in which the two surface acoustic wave resonators are coupled together with the back surface of the one resonator bonded to the back surface of the other resonator. When acceleration acts in the direction of thickness of the acceleration detection element, the acceleration detection element is deflected in the direction of thickness. With the acceleration detection element deflected, tensile stress is generated in the one surface acoustic wave resonator while compressive stress is generated in the other surface acoustic wave resonator. The surface acoustic wave resonator generates a surface acoustic wave (SAW) on the piezoelectric substrate with a signal input between the pair of IDT electrodes. The resonator has a predetermined resonance impedance between the pair of electrodes. The surface acoustic wave travels on only the surface of the piezoelectric substrate, while being immediately attenuated in its travel in the direction of thickness of the substrate. Almost no surface wave travels to the back surface of the substrate having no electrodes. Even if the two surface acoustic wave resonators are laminated with the back surface of the one resonator bonded to the back surface of the other resonator, the vibrations of the two resonators are isolated from each other. Each resonator resonates at its own natural frequency. The frequency of the surface acoustic wave resonator on the tensile stress side becomes low, while the frequency of the surface acoustic wave resonator on the compressive stress side becomes high. Acceleration is thus detected with high gain if the frequency changes of the two resonator or the impedance changes of the two resonators are differentially picked up.

Since the frequency difference or the impedance difference is detected rather than individually picking up the frequency changes of the two resonators or the impedance changes of the two resonator, stresses commonly acting on the two surface acoustic resonators (a stress due to a temperature change, for example) cancel each other out. A high-gain acceleration sensor free from the effect of temperature changes is provided.

When the surface acoustic wave resonators are bonded, an adhesive agent, which is hard in the set state thereof, may be used. Alternatively, an adhesive agent, having a certain degree of softness (elasticity) in the set state thereof, may be used. The surface acoustic wave spreads inwardly while being attenuated at the same time. To prevent the vibrations on the front surface and the back surface from interfering with each other, some thickness is required of the element. The thickness of the element must typically be two to ten times larger than the wavelength of the surface acoustic wave. However, if the element is too thick, the element is difficult to deflect under acceleration. From the standpoint of detection gain of acceleration, a thinner element is better. The bimorph structure having the resonators bonded with the elastic adhesive interposed therebetween substantially attenuates vibration in the adhesive layer. Vibration does not travel between the front surface and the back surface of the element even if the element is thin. The acceleration detection element having a thin overall thickness works.

The adhesive agent may be an elastic adhesive agent such as an epoxy-based adhesive or an acrylic adhesive.

The present invention relates to an acceleration sensor and includes a bimorph type acceleration detection element including two surface acoustic wave resonators which include a single piezoelectric substrate, and a pair of IDT electrodes arranged on each of the front and back surfaces of the piezoelectric substrate. The acceleration detection element is supported at an end thereof such that the acceleration detection element is deflected in the thickness direction of the piezoelectric substrate under acceleration. Acceleration is detected by differentially detecting a frequency change or an impedance change of said two surface acoustic wave resonators which is caused by the deflection of the acceleration detection element.

Two types of surface acoustic wave resonators are typically available: a first type is fabricated of a piezoelectric substrate having IDT electrodes arranged on the surface thereof, and a second type is fabricated of a glass substrate having IDT electrodes arranged on the surface thereof with a piezoelectric film deposited on the IDT electrodes. In the first and second aspects of the present invention, the surface acoustic wave resonator is of the first type, while in third and fourth aspect of the present invention to be discussed later, the surface acoustic wave resonator is of the second type.

The present invention relates to an acceleration sensor and includes a bimorph type acceleration detection element including a pair of surface acoustic wave resonators laminated to each other with the back surface of one resonator bonded to the back surface of the other resonator, wherein each resonator includes a glass substrate, a pair of IDT electrodes which are arranged on the front surface of the glass substrate, and a piezoelectric film which is deposited on the glass substrate including the IDT electrodes. The acceleration detection element is supported at an end thereof such that the acceleration detection element is deflected in the thickness direction of the glass substrate under acceleration. Acceleration is detected by differentially detecting a frequency change or an impedance change of said two surface acoustic wave resonators which is caused by the deflection of the acceleration detection element.

The bimorph type acceleration detection element is constructed by laminating the pair of surface acoustic wave resonators together with the back surface of one resonator bonded to the back surface of the other resonator. Each resonator includes the glass substrate, the pair of IDT electrodes which are arranged on the front surface of each resonator, and the piezoelectric film which is deposited on the glass substrate bearing the IDT electrodes. In this case as well, the back surface of the glass substrate is out of reach of the surface acoustic wave. Even if the surface acoustic wave resonators are laminated with the back surface of the one resonator bonded to the back surface of the other resonator, the resonators resonate at the natural frequencies thereof with the vibrations thereof isolated from each other.

The present invention relates to an acceleration sensor and includes a bimorph type acceleration detection element including two surface acoustic wave resonators, which include a single glass substrate, a pair of IDT electrodes arranged on each of the front and back surfaces of the glass substrate, and a piezoelectric film which is deposited on the glass substrate including the IDT electrodes thereon. The acceleration detection element is supported at an end thereof such that said acceleration detection element is deflected in the thickness direction of the glass substrate under acceleration. Acceleration is detected by differentially detecting a frequency change or an impedance change of said two surface acoustic wave resonators which is caused by the deflection of the acceleration detection element.

The bimorph type acceleration detection element is formed of two surface acoustic wave resonators, which include the single glass substrate, the pair of IDT electrodes arranged on each of the front and back surfaces of the glass substrate, and the piezoelectric film which is deposited on the glass substrate having the IDT electrodes thereon. This arrangement prevents two surface acoustic waves from interfering with each other taking advantage of the property of surface acoustic wave that the surface acoustic wave travels on the surface of the glass substrate with almost no component of the surface acoustic wave traveling in the direction of thickness of the glass substrate.

The acceleration detection element is packaged as discussed below for use as a surface-mounting component.

Preferably, a pair of casing members are respectively arranged on two opposed side surfaces of the acceleration detection element facing in a direction in which acceleration is applied, each casing member having a recess in the portion thereof at least facing the IDT electrodes and bonded on both ends thereof, and a pair of covering members are respectively bonded around the peripheral outline portions thereof to two open surfaces defined by the acceleration element and the casing members. The IDT electrodes arranged on the two surface acoustic wave resonators are respectively connected to external electrodes arranged on the external surfaces of the covering members via electrodes arranged on the surfaces of the casing members.

In this arrangement, the acceleration detection element is fully enclosed in the casing members and the covering members, thereby forming a surface-mounting component. Since the acceleration detection element is supported at both ends thereof and not supported at both longitudinal sides, the acceleration detection element is easily deflected.

Preferably, a pair of casing members are respectively arranged on two opposed side surfaces of the acceleration detection element facing in a direction in which acceleration is applied, each casing member having a recess in the portion thereof at least facing the IDT electrode and bonded on the entire peripheral outline portion thereof, wherein the IDT electrodes arranged on the two surface acoustic resonators are connected to terminal electrodes provided along side edges of the acceleration detection element, and the terminal electrodes are respectively connected to external electrodes arranged on the external surfaces of the casing members.

In this arrangement, the acceleration detection element is easily structured into a surface-mounting component by respectively bonding the casing members to the front surface and the back surface of the acceleration detection element. The acceleration detection element is surrounded on the four sides thereof by the casing members.

The acceleration sensor of the present invention uses two methods for differentially picking up the signals from the surface acoustic wave resonators and for obtaining a signal proportional to acceleration acting on the acceleration detection elements. In one method, the surface acoustic wave resonators are oscillated at different frequencies, a difference between the oscillated frequencies is detected, and a signal proportional to acceleration is determined from the frequency difference. In the other method, the surface acoustic wave resonators are oscillated at the same frequency, one of a phase difference and an amplitude difference is obtained from a difference between electric impedances of the two resonators, and a signal proportional to acceleration is determined from one of the phase difference and the amplitude difference.

Acceleration is detected with high accuracy using either of the above two methods.

DESCRIPTION OF THE PREFERRED EMBODIMENTS

Figure 1:
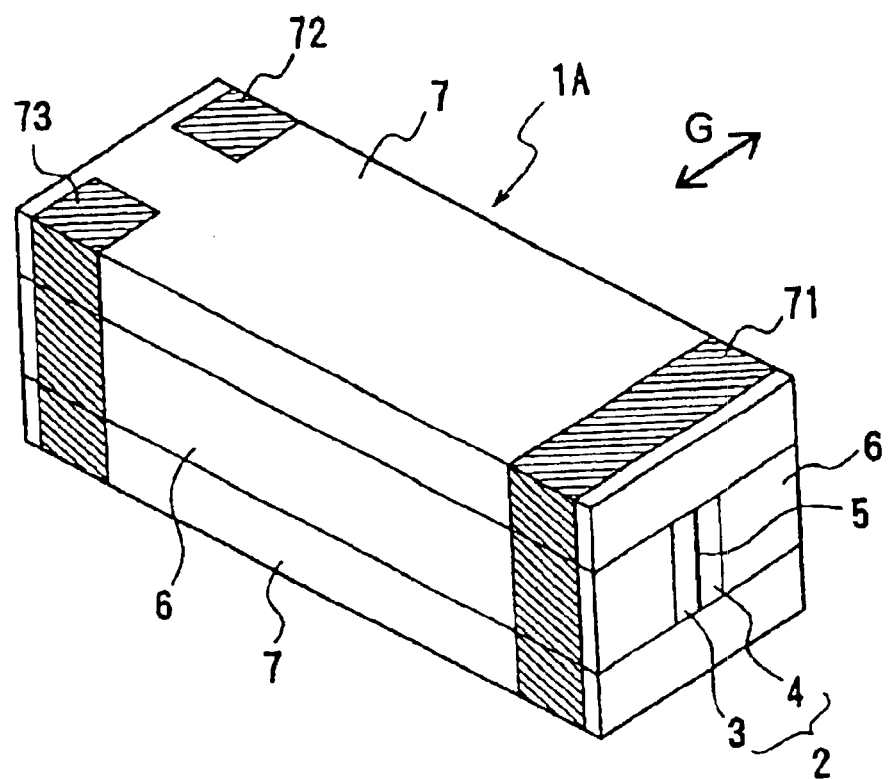
FIG. 1 is a general perspective view showing a first embodiment of the acceleration sensor of the present invention.
Figure 2:
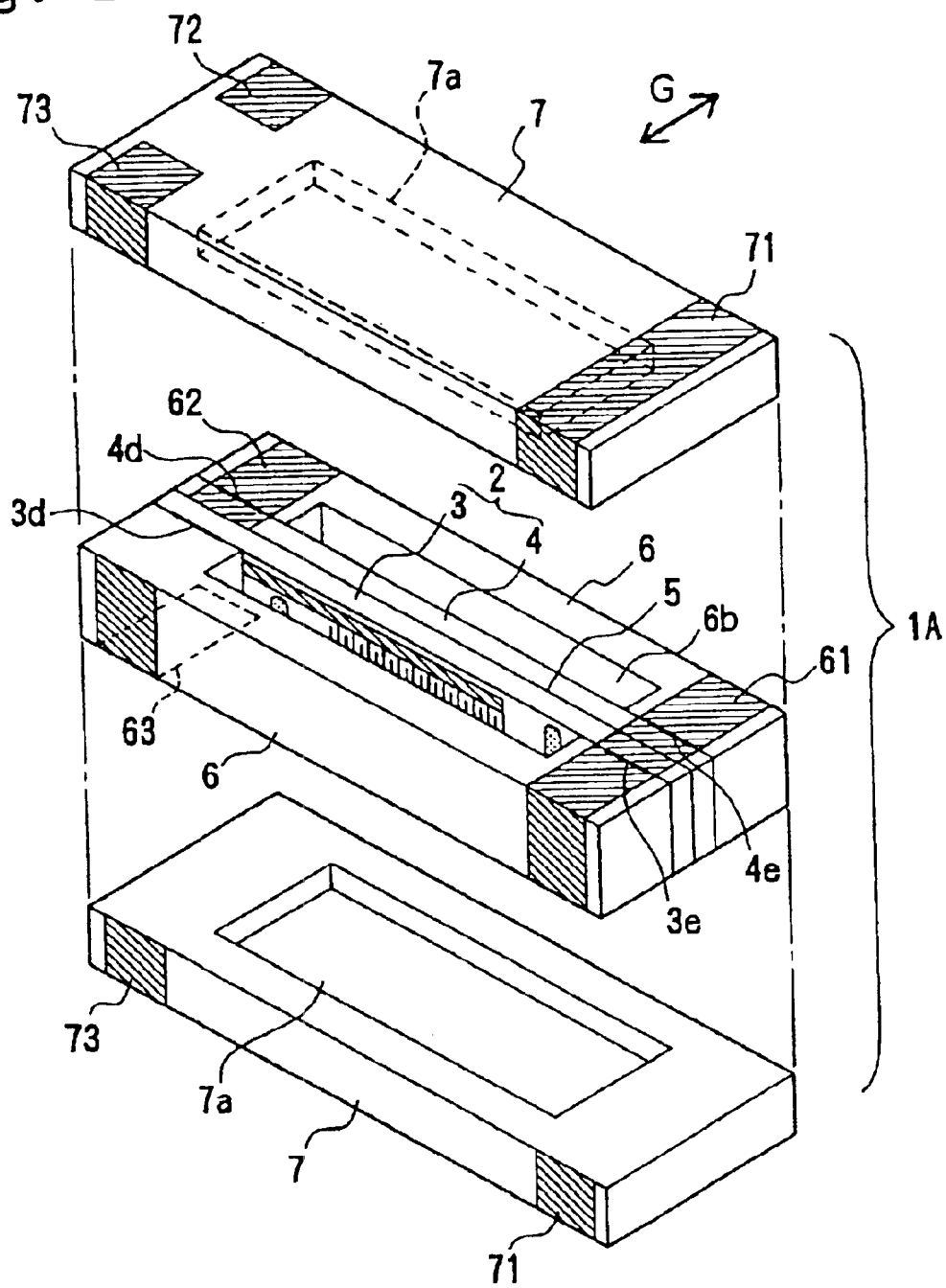
FIG. 2 is an exploded perspective view showing the acceleration sensor of FIG. 1.

FIG. 1 through FIG. 5 show an acceleration sensor 1A of a first embodiment of the present invention. The acceleration sensor 1A includes a bimorph type acceleration detection element 2 which is supported at both ends thereof in insulating cases 6 and 7 fabricated of ceramic. The acceleration detection element 2 is produced by laminating a pair of striplike surface acoustic wave resonators 3 and 4 with an intermediate adhesive layer 5 interposed therebetween, and with the back surface of the resonator 3 bonded to the back surface of the resonator 4.

Figure 3:
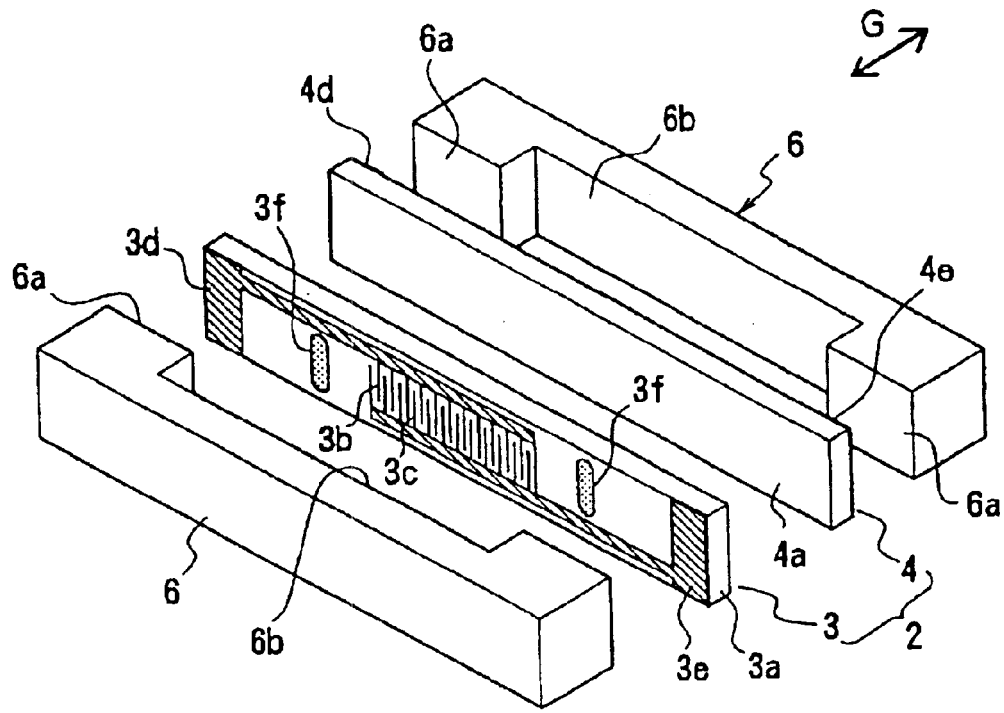
FIG. 3 is an exploded perspective view showing the acceleration sensor of FIG. 1 with a covering member removed.

Referring to FIG. 3, the surface acoustic wave resonators 3 and 4 in the first embodiment are respectively formed of piezoelectric substrates 3a and 4a fabricated of a PZT based ceramic or an LiTaO$_3$ single crystal. The piezoelectric substrate 3a has IDT electrodes 3b and 3c in the center portion of the front surface thereof, and terminal electrodes 3d and 3e, on the front surface near different opposed ends thereof, respectively connected to the IDT electrodes 3b and 3c. The piezoelectric substrate 4a has IDT electrodes 4b and 4c in the center portion of the front surface thereof, and terminal electrodes 4d and 4e, on the front surface near different opposed ends thereof, respectively connected to the IDT electrodes 4b and 4c. Acoustic wave absorbing materials 3f and 4f for absorbing the surface acoustic wave leaked from the IDT electrodes 3b, and 3c, and the IDT electrodes 4b, and 4c are respectively arranged on the piezoelectric substrates 3a and 4a. FIG. 3 shows the electrodes for the surface acoustic wave resonator 3 only, but the surface acoustic wave resonator 4 is also provided with electrodes fully identical to those of the surface acoustic wave resonator 3.

When a predetermined signal is applied between the terminal electrodes 3d and 3e, and between the terminal electrodes 4d and 4e, the piezoelectric substrates 3a and 4a generate surface acoustic waves on the surfaces thereof. The surface acoustic waves travel in a direction perpendicular to the IDT electrodes 3b and 3c, and the IDT electrodes 4b and 4c, and are then reflected from a number of IDT electrodes. The surface acoustic wave resonators 3 and 4 function between the terminal electrodes 3d and 3e and the terminal electrodes 4d and 4e as a resonator having a resonance impedance.

The adhesive layer 5 bonds together the two surface acoustic wave resonators 3 and 4 and has a hardness to allow flexural stress from one surface acoustic wave resonator to the other surface acoustic wave resonator. The adhesive layer 5 may be an elastic adhesive agent. In the first embodiment, the surface acoustic wave resonators 3 and 4 are formed of identically shaped piezoelectric substrates, and a flexurally neutral plane (represented by dotted line N in FIG. 5) occurring in response to acceleration G applied on the acceleration detection element 2 lies at the center level in thickness of the two surface acoustic wave resonators 3 and 4.

Even if the two surface acoustic wave resonators 3 and 4 are securely bonded using the adhesive layer 5, the surface acoustic waves generated in the surface acoustic wave resonators 3 and 4 respectively travel on the surfaces of the piezoelectric substrates 3a and 4a with almost no component of the surface acoustic waves traveling in the direction of thickness. The vibrations of the surface acoustic wave resonators 3 and 4 are thus isolated from each other. The vibration of the one resonator does not influence the vibration of the other resonator.

A pair of left and right casing members 6 and 6 surround the external opposed side surfaces facing in a direction in which acceleration G is applied. Each of the casing members 6 has a flattened U-shaped cross section, and both projecting ends 6a thereof are securely bonded to the external opposed side surfaces of the acceleration detection element 2 (the side surfaces of the surface acoustic wave resonators 3 and 4). A recess 6b of each of the casing members 6 forms a gap between each of the casing members 6 and the acceleration detection element 2, thereby permitting the acceleration detection element 2 to deflect under acceleration G. The top and bottom open surfaces of the acceleration detection element 2 and the casing members 6 are covered with covering members 7 and 7 from above and below. The covering members 7 respectively have, on the inner surfaces thereof, recesses 7a forming a gap not to contact respectively the acceleration detection element 2. The peripheral outline portions of covering members 7 are respectively securely bonded to the top and bottom open surfaces of the acceleration detection element 2 and the casing members 6. Displaceable portions of the acceleration detection element 2 under acceleration G is fully enclosed in the casing members 6 and the covering member 7.

The casing members 6, and the covering member 7 are fabricated of insulating materials. Specifically, these components may be formed of ceramic substrates or resin substrates.

The casing members 6 having a U-shaped cross section are used in this embodiment. If a vibration space is assured by the thickness of each adhesive layer applied between the one casing member 6 and the acceleration detection element 2, the casing members 5 may be formed of a planar member. Since the deflection of the acceleration detection element 2 under the acceleration G is small in amplitude, the thickness of the adhesive layer provides a sufficiently large vibration space.

Similarly, since a gap can be formed by the thickness of an adhesive layer applied in the inner surface of the covering member 7, the gap forming recess 7a in the inner surface of the covering member 7 may be dispensed with.

The terminal electrodes 3e and 4e, out of the terminal electrodes 3d and 3e, and the terminal electrodes 4d and 4e formed in the surface acoustic wave resonators 3 and 4, are electrically connected to each other through an internal electrode band 61 arranged on the open surfaces of the acceleration detection element 2 and the casing members 6, and are routed out of the external surface of the casing members 6. The electrode 4d is routed out of the external surface of the casing member 6 through an internal electrode 62 arranged on the top open surface of the acceleration detection element 2 and the casing members 6. The electrode 3d is routed out of the external surface of the other casing member 6 through an internal electrode 63 arranged on the bottom open surface of the acceleration detection element 2 and the casing members 6.

Referring to FIG. 1, the casing members 6 and the covering member 7 have, on the external surfaces thereof, external electrodes 71, 72, and 73. The internal electrode bands 61, 62, and 63 are respectively electrically connected to the external electrodes 71, 72, and 73. In this way, a surface-mounting chip type acceleration sensor is provided.

Figure 4:
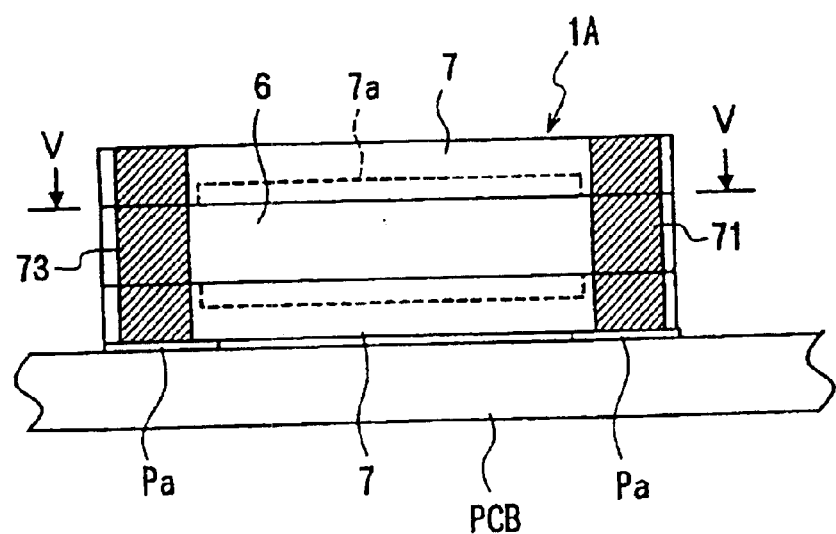
FIG. 4 is a side view of the acceleration sensor of FIG. 1 mounted on a printed circuit board.

In the first embodiment, the one electrode 3e of the acceleration detection element 3 is electrically connected to the one electrode 4e of the acceleration detection element 4 through the internal electrode band 61 as a common electrode. Alternatively, the four electrodes 3d, 3e, 4d, and 4e may be independently routed out to respective external electrodes. In this case, the four internal electrode bands and the four external electrodes may be used. FIG. 4 shows the acceleration sensor 1A mounted on a circuit pattern Pa of a printed circuit board PCB.

Figure 6:
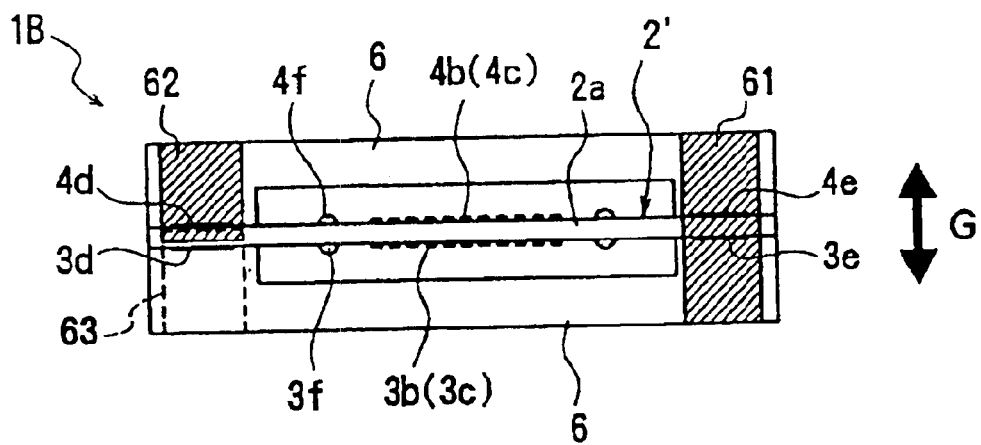
FIG. 6 is similar to the cross-sectional view of the acceleration sensor in FIG. 4 taken along line V—V, but showing a second embodiment of the acceleration sensor of the present invention.

FIG. 6 shows a acceleration sensor 1B of a second embodiment of the present invention.

Figure 5:
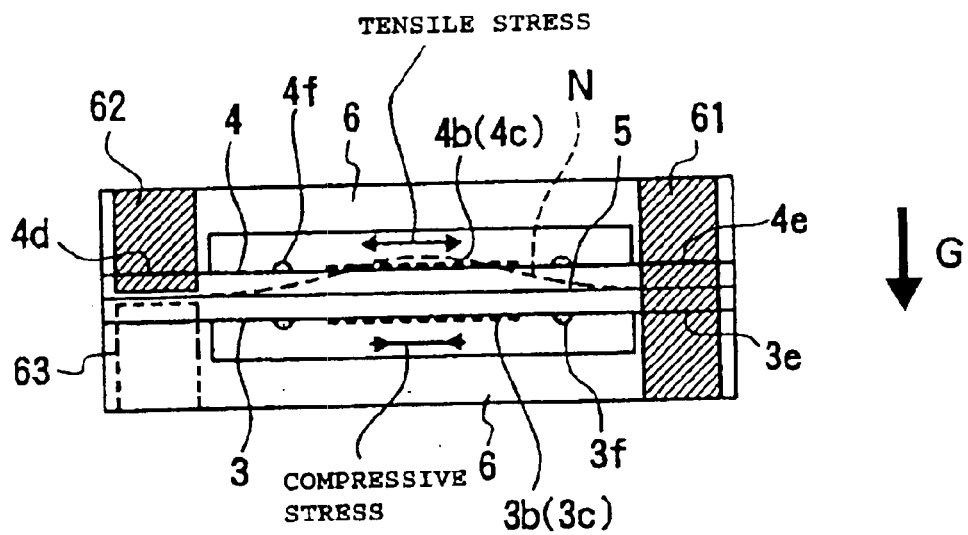
FIG. 5 is a cross-sectional view of the acceleration sensor taken along line V—V in FIG. 4.

The acceleration sensor 1B includes a bimorph type acceleration detection element 2' composed of two surface acoustic wave resonators, which are formed of a single striplike piezoelectric substrate 2a and two pairs of IDT electrodes 3b and 3c and IDT electrodes 4a and 4b respectively arranged on the central portions of both sides of the piezoelectric substrate 2a. Components identical to those described with reference to FIG. 5 are designated with the same reference numerals, and the discussion thereof is skipped.

Surface acoustic wave travels on the surface of the piezoelectric substrate 2a with almost no component of the surface acoustic wave traveling in the direction of thickness. Taking advantage of this property, a single piezoelectric substrate 2a forms two surface acoustic wave resonators.

Since the two bonded piezoelectric substrates are not used in this arrangement, the thickness of the acceleration detection element 2' is thin.

To prevent the surface acoustic waves on the front surface and the back surfaces of the substrate from interfering with each other, the thickness of the piezoelectric substrate 2a is preferably two to ten times larger than the wavelength of the surface acoustic wave.

Figure 7:
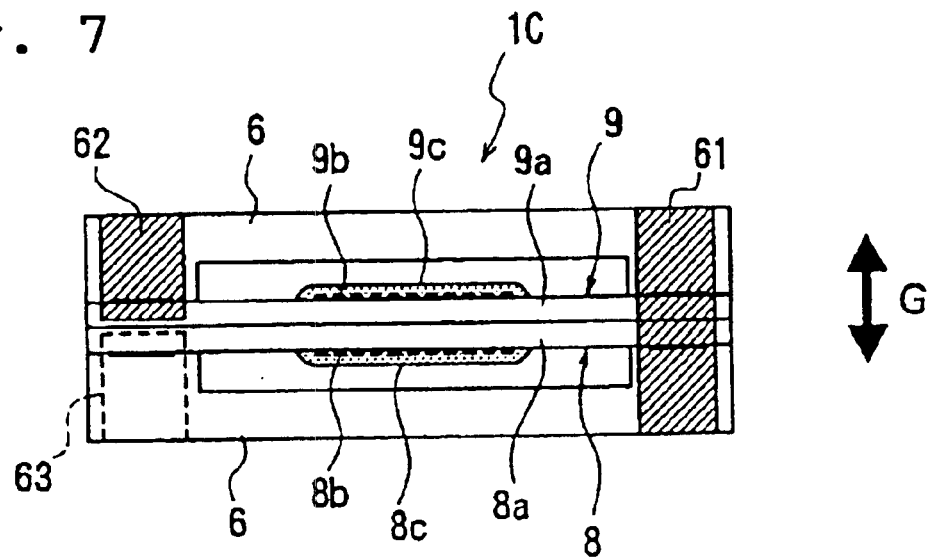
FIG. 7 is similar to the cross-sectional view of the acceleration sensor in FIG. 4 taken along line V—V, but showing a third embodiment of the acceleration sensor of the present invention.

FIG. 7 shows an acceleration sensor 1C of a third embodiment of the present invention.

The acceleration sensor 1C includes a bimorph type acceleration detection element composed of two surface acoustic wave resonators 8 and 9. The surface acoustic wave resonator 8 is produced by arranging a pair of IDT electrodes 8b on a striplike glass substrate 8a and by depositing a piezoelectric film 8c fabricated of ZnO. The surface acoustic wave resonator 9 is produced by arranging a pair of IDT electrode 9b on a striplike glass substrate 9a and by depositing a piezoelectric film 9c fabricated of ZnO on the IDT electrodes 8b on the glass substrate 8a on the IDT electrodes 9b on the glass substrate 9a.

In the same way as in the first embodiment, the surface acoustic wave resonators 8 and 9 having the piezoelectric films 8c and 9c formed thereon are laminated with the back surfaces thereof mutually bonded to each other.

Since the surface acoustic waves generated by the IDT electrodes 8b and 9b travel on only the surfaces of the glass substrates 8a and 9a, the surface acoustic waves traveling on the two surfaces do not interfere with each other.

Figure 8:
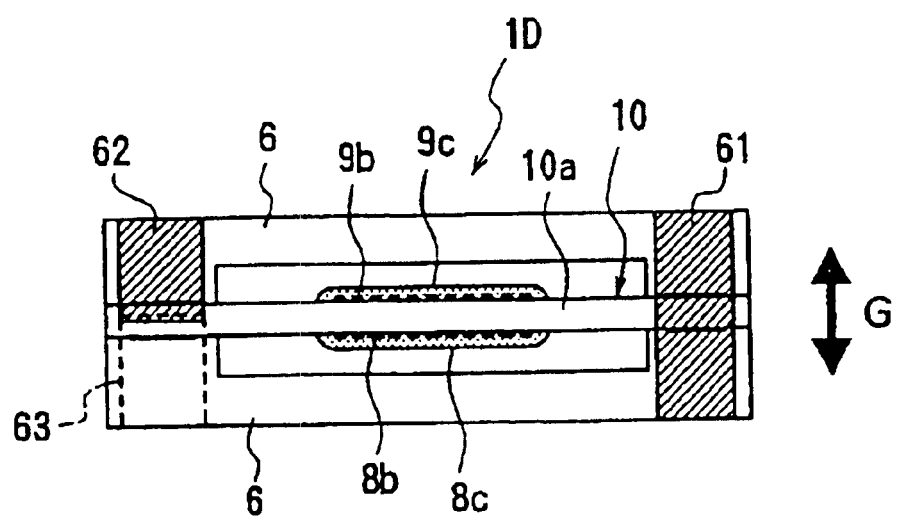
FIG. 8 is similar to the cross-sectional view of the acceleration sensor in FIG. 4 taken along line V—V, but showing a fourth embodiment of the acceleration sensor of the present invention.

FIG. 8 shows an acceleration sensor 1D of a fourth embodiment of the present invention.

The acceleration sensor 1D includes a bimorph type acceleration detection element 10 composed of two surface acoustic wave resonators. The two surface acoustic wave resonators are produced by arranging a pair of IDT electrodes 8b and a pair of IDT electrodes 9b respectively on the central portions of both sides of a single striplike glass substrate 10a, and by depositing piezoelectric films 8c and 9c respectively on the IDT electrodes 8b and 9b. Components identical to those described with reference to FIG. 7 are designated with the same reference numerals and the discussion thereof is skipped.

In the same way as in the third embodiment, the two surface acoustic wave resonators are independently resonated. The thickness of the glass substrate 10a is preferably two to ten times larger than the wavelength of the surface acoustic wave.

Figure 9:
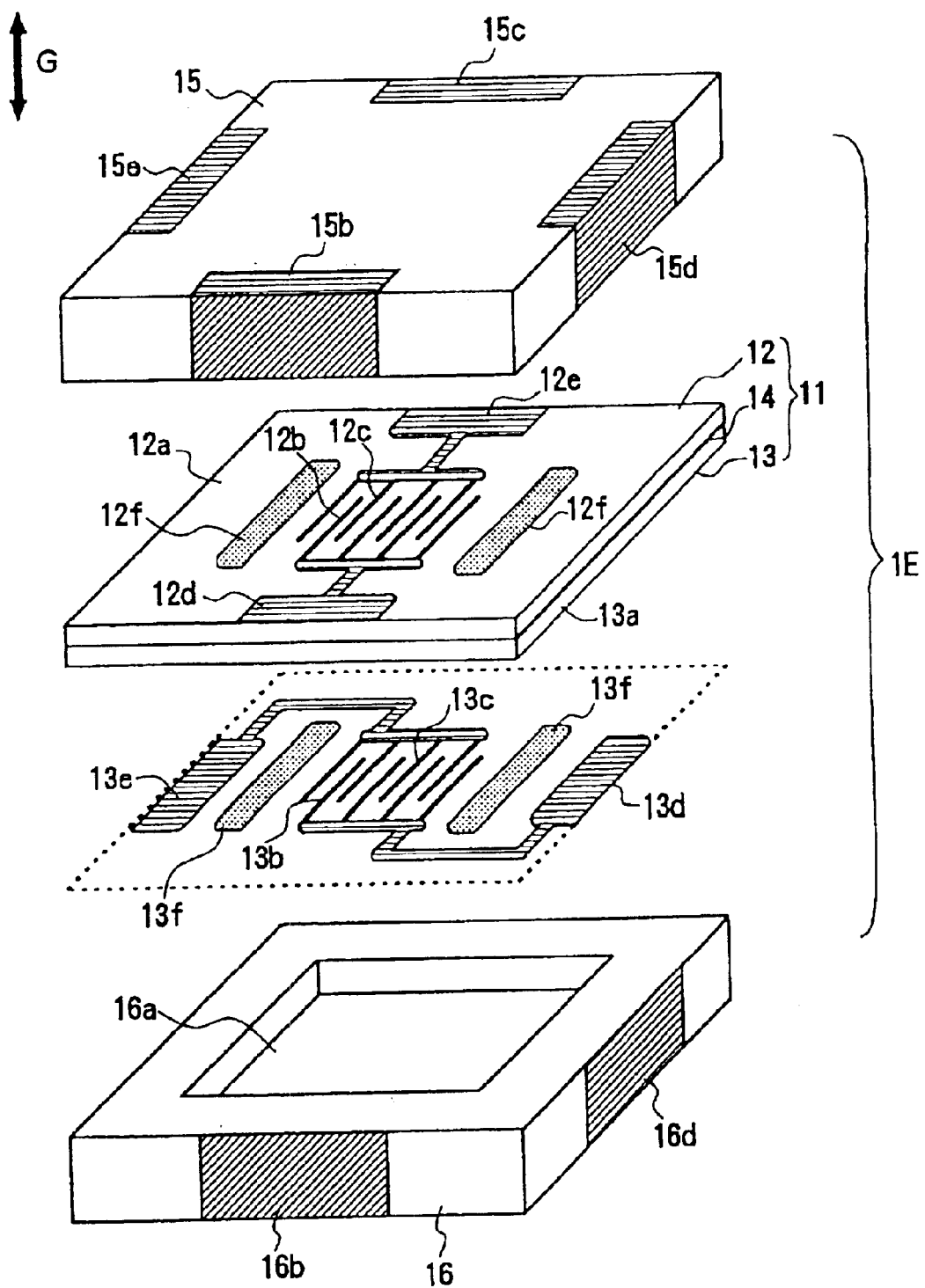
FIG. 9 is an exploded perspective view of a fifth embodiment of the acceleration sensor of the present invention.

FIG. 9 shows an acceleration sensor 1E of a fifth embodiment of the present invention.

The acceleration sensor 1E includes a bimorph type acceleration detection element 11 which is formed on two generally square surface acoustic wave resonators 12 and 13 laminated to each other with an adhesive layer 14 interposed therebetween. The surface acoustic wave resonator 12 includes a piezoelectric ceramic substrate 12a, IDT electrodes 12b and 12c, terminal electrodes 12d and 12e respectively extending toward opposed ends from the IDT electrodes 12b and 12c, and acoustic wave absorbing materials 12f for absorbing leaked acoustic wave. The surface acoustic wave resonator 13 includes a piezoelectric ceramic substrate 13a, IDT electrodes 13b and 13c, terminal electrodes 13d and 13e respectively extending toward opposed ends from the IDT electrodes 13b and 13c, and acoustic wave absorbing materials 13f for absorbing leaked acoustic wave. The terminal electrodes 12d, and 12e, 13d, and 13e are routed out to four different end faces of each of the piezoelectric ceramic substrates 12a and 13a. FIG. 9 also shows an electrode pattern of the lower surface acoustic wave resonator 13.

A pair of casing members 15 and 16, having recesses 15a and 16a (although 15a not shown) in the central portions thereof, are bonded along the peripheral outline portions thereof on the acceleration detection element 11 from above and below. The casing members 15 and 16 have four external electrodes 15b–15e, and 16b–16e (16c and 16e are not shown) on the four external side surfaces. The four external electrodes are respectively electrically connected to the four terminal electrodes 12d, 12e, 13d, and 13e of the acceleration detection element 11.

One terminal electrode of the surface acoustic wave resonator 12 and one terminal electrode of the surface acoustic wave resonator 13 may be connected together as a common electrode.

When acceleration G acts in a vertical direction, i.e., in the direction of thickness of the acceleration detection element 11, the central portion of the acceleration detection element 11, the edges of which are supported, is deflected. Tensile stress is generated in the one surface acoustic wave resonator while compressive stress is generated in the other surface acoustic wave resonator. A surface-mounting component is easily produced by laminating the two surface acoustic wave resonators 12 and 13 and the casing members 15 and 16.

Figure 10:
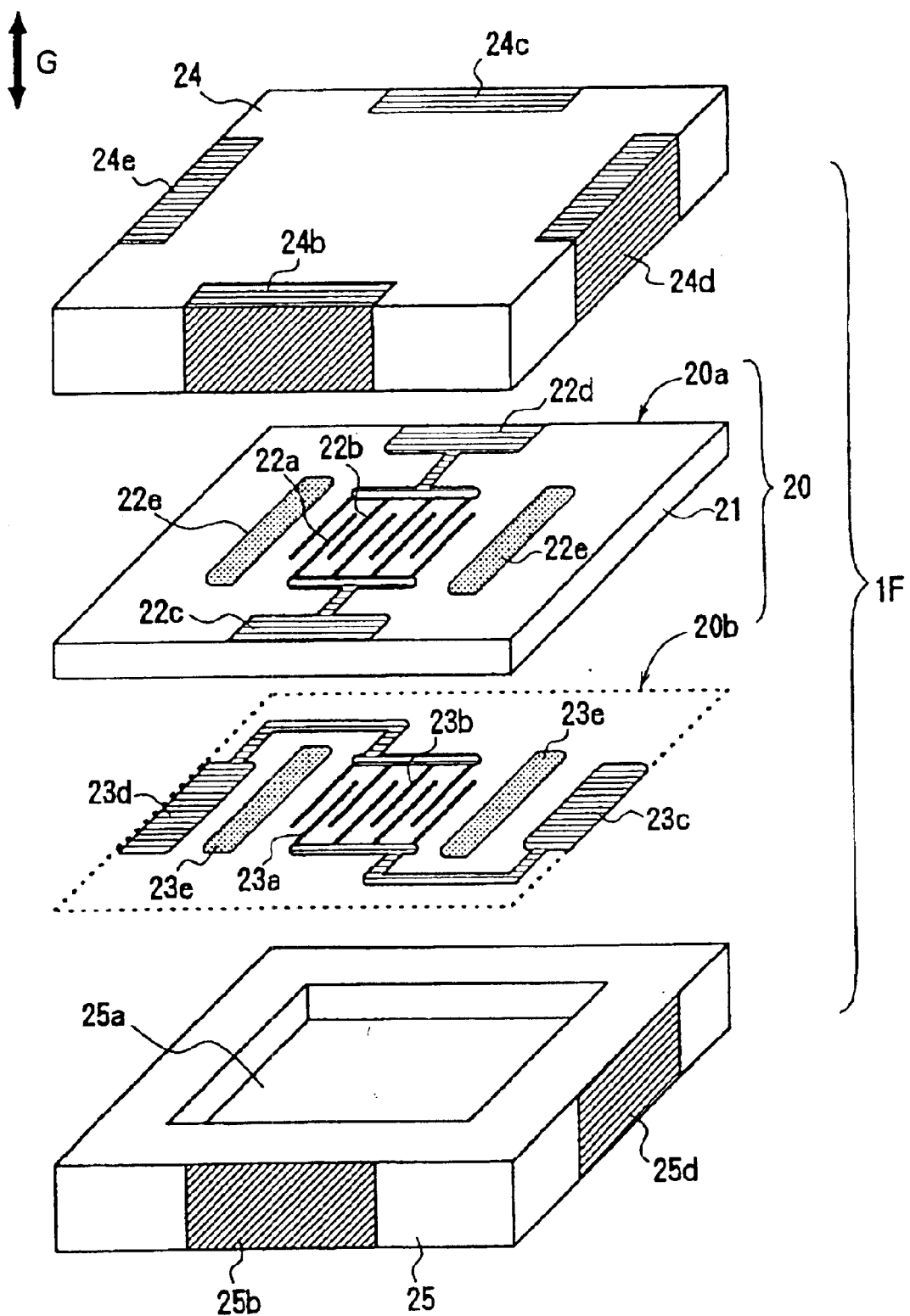
FIG. 10 is an exploded perspective view of a sixth embodiment of the acceleration sensor of the present invention.

FIG. 10 shows an acceleration sensor 1F of a sixth embodiment of the present invention.

The acceleration sensor 1F includes a bimorph type acceleration detection element 20 composed of surface acoustic wave resonators 20a and 20b. The surface acoustic wave resonators 20a includes a single generally square piezoelectric ceramic substrate 21, IDT electrodes 22a and 22b arranged on one surface of the ceramic substrate 21, electrode terminals 22c and 22d respectively extending from the IDT electrodes 22a and 22b to opposed ends of the ceramic substrate 21, and acoustic wave absorbing materials 22e for leaked absorbing acoustic wave. The surface acoustic wave resonator 20b includes the single generally square piezoelectric ceramic substrate 21, IDT electrodes 23a and 23b arranged on the other surface of the ceramic substrate 21, electrode terminals 23c and 23d respectively extending from the IDT electrodes 23a and 23b to opposed ends of the ceramic substrate 21, and acoustic wave absorbing materials 23e for absorbing leaked acoustic wave. The terminal electrodes 22c, 22d, 23c, and 23d are routed out of the four different end faces of the piezoelectric ceramic substrate 21. FIG. 10 also shows the electrode pattern on the back surface of the ceramic substrate 21.

Casing members 24 and 25 are respectively bonded to the top and bottom surface of the acceleration detection element 20 in the same way as shown in FIG. 9. Specifically, the casing members 24 and 25, having recesses 24a and 25a (although 24a is not shown) in the central portions thereof, are bonded along the peripheral outline portions thereof on the acceleration detection element 20 from above and below. The casing members 24 and 25 have four external electrodes 24b–24e, and 25b–25e (25c and 25e not shown) on the four external side surfaces. The four external electrodes are respectively electrically connected to the four terminal electrodes 22c, 22d, 23c, and 23d.

One terminal electrode of the surface acoustic wave resonator 20a and one terminal electrode of the surface acoustic wave resonator 20b may be connected together as a common electrode.

As in the fifth embodiment, when acceleration G acts in a vertical direction, i.e., in the direction of thickness of the acceleration detection element 11, the central portion of the acceleration detection element 20, the edges of which are supported, is deflected. Tensile stress is generated in the one surface acoustic wave resonator while compressive stress is generated in the other surface acoustic wave resonator. A surface-mounting component is easily produced by laminating the single piezoelectric ceramic acceleration detection element 20 and the casing members 24 and 25.

Figure 11:
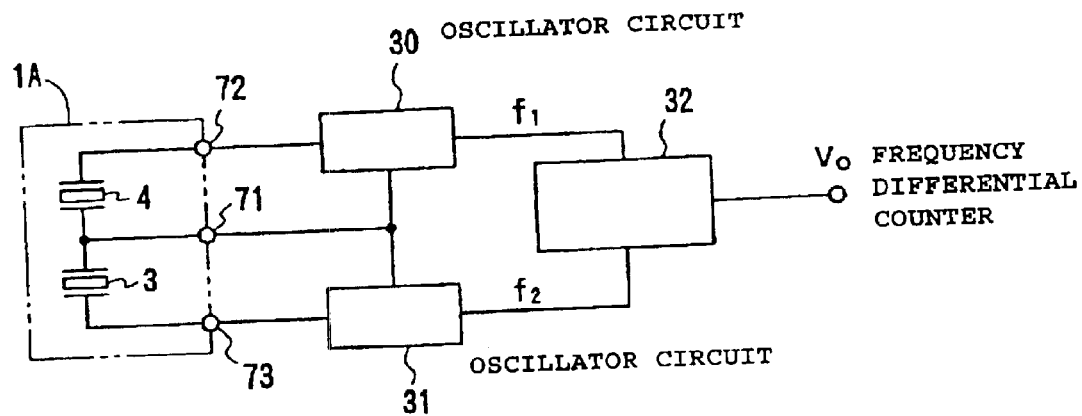
FIG. 11 is a circuit diagram showing an acceleration detection device incorporating the acceleration sensor of the present invention.

FIG. 11 shows an acceleration detection device employing the acceleration sensor 1A.

The device uses independent vibrations of the acceleration detection elements 3 and 4. The external electrodes 71 and 72 of the acceleration sensor 1A are connected to an oscillator circuit 30, and the external electrodes 71 and 73 are connected to an oscillator circuit 31. The oscillator circuits 30 and 31 may be a known Colpitts oscillator. The resonators 3 and 4 are independently resonated by the oscillator circuits 30 and 31, and oscillated frequencies $f_1$ and $f_2$ are input to a frequency differential counter 32. The frequency differential counter 32 outputs a signal $V_0$ proportional to the frequency difference.

When no acceleration G is applied to the acceleration sensor 1A, the two resonators 3 and 4 are resonated at constant frequencies as independent resonators. If the resonators 3 and 4 have a fully identical structure, the same frequency is oscillated, and the output signal $V_0$ of the frequency differential counter 32 is zero. When acceleration G is applied to the acceleration sensor 1A, inertia in a direction opposite to the direction of applied acceleration acts on the acceleration detection element 2. The central portion of the acceleration detection element 2 is deflected in the direction opposite to the direction of the applied acceleration. Associated with the deflection of the acceleration detection element 2, tensile stress is generated in the one resonator 4 and compressive stress is generated in the other resonator 3 as shown in FIG. 5. The tensile resonator 4 drops in oscillation frequency while the compressive resonator 3 rises in oscillation frequency. The frequency difference is output from the electrodes 3d and 3e, 4d and 4e to the external electrodes 71, 72, and 73 through the internal electrode bands 61, 62, and 63. The signal $V_0$ proportional to the acceleration G is thus obtained.

Not only the magnitude of the acceleration G but also the direction of the acceleration G are detected from the signal $V_0$.

When the acceleration sensor 1A is used in a temperature varying environment, the surface acoustic wave resonators 3 and 4, the casing members 6, and the covering members 7 thermally expand. When the thermal expansion coefficient of the surface acoustic wave resonators 3 and 4 is different from that of the casing members 6 and the covering members 7, stresses are generated in the surface acoustic wave resonators 3 and 4. A change in the frequency difference takes place due to factors other than acceleration. However, if the surface acoustic wave resonators 3 and 4 are fabricated of the same material and are identically shaped, generated stresses also become equal. Since the frequency counter 32 provides a difference between the outputs of the surface acoustic wave resonators 3 and 4, changes taking in the output signals when the surface acoustic wave resonators 3 and 4 are equally subject to a temperature change cancel each other out. An acceleration detection device susceptible to acceleration G only is thus provided.

Figure 12:
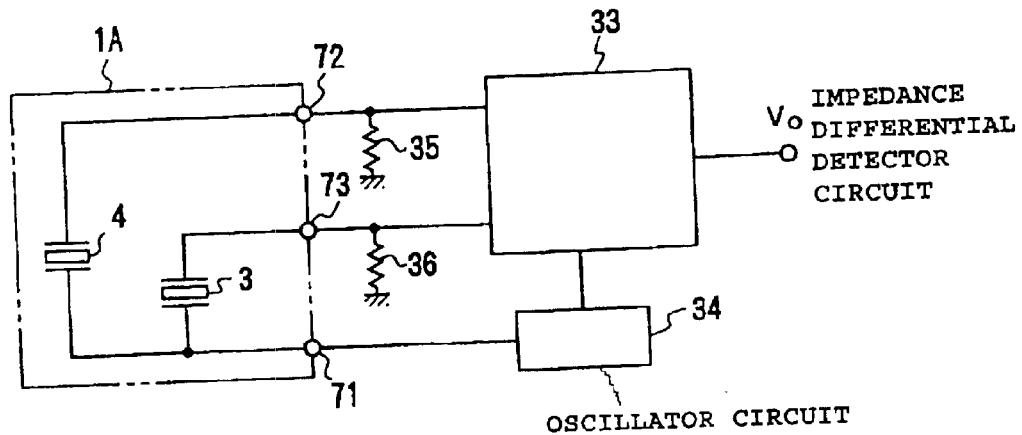
FIG. 12 is a circuit diagram showing another acceleration detection device incorporating the acceleration sensor of the present invention.

FIG. 12 shows another acceleration detection device employing the acceleration sensor 1A.

The acceleration detection device uses the same frequency vibrations of the surface acoustic wave resonators 3 and 4. The external electrodes 72 and 73 of the acceleration sensor 1A are connected to an impedance differential detector circuit 33. The external electrode 71 as a common electrode is connected to an oscillator circuit 34. Also included in the device are matching resistors 35 and 36. The two surface acoustic wave resonators 3 and 4 are resonated at the same frequency by the oscillator circuit 34. A phase difference or an amplitude difference is detected from a difference between electric impedances of the surface acoustic wave resonators 3 and 4, and an output $V_0$ proportional to acceleration G is obtained from the impedance differential detector circuit 33. To cause the two surface acoustic wave resonators 3 and 4 to resonate at the same frequency, the oscillator circuit 34 is arranged so that one of the outputs of the two resonators or the sum of the outputs of the two resonators are fed back.

In this example as in the embodiment shown in FIG. 9, the signal proportional to acceleration G is picked up, while changes in the outputs due to a temperature change cancel each other out. An acceleration detection device sensitive to the acceleration G only is thus provided.

The above embodiments are presented as illustrative only, and various changes and modifications are possible without departing from the scope of the present invention.

The acceleration sensor 1A of the first embodiment is employed in the acceleration detection devices shown in FIG. 11 and FIG. 12, and each of the acceleration sensors 1B–1F respectively in accordance with the second through sixth embodiments may be equally used.

Each of the acceleration sensors 1A–1F is structured so that the detection element is rigidly supported at both ends or both side edges thereof by the casing member. Alternatively, the detection element may be supported at one end only, i.e., may have a cantilever structure. In this case, displacement of the detection element at the free end thereof is large under acceleration, and a large frequency change or a large impedance change may be obtained.

The adhesive layer 5 that bonds the surface acoustic wave resonators 3 and 4 together needs to be hard enough to transfer flexural stress from one resonator to the other resonator, and within this required hardness range, the adhesive layer 5 preferably prevents surface acoustic wave from travelling in the direction of thickness.

Since the acceleration sensor of the present invention includes a bimorph type acceleration detection element in which the two surface acoustic wave resonators are coupled together with the back surface of the one resonator bonded to the back surface of the other resonator, compressive stress is generated in the one surface acoustic wave resonator while tensile stress is generated in the other surface acoustic wave resonator, in response to the deflection of the acceleration detection element under acceleration. The surface acoustic wave resonator generates a surface acoustic wave on the surface only. Even if the two surface acoustic wave resonators are laminated with the back surface of the one resonator bonded to the back surface of the other resonator, the vibrations of the two resonators are isolated from each other. Each resonator resonates at its own natural frequency. By differentially picking up the frequency change of the two resonators or the impedance change of the two resonators, a signal proportional to acceleration is obtained. A high detection-gain acceleration sensor is thus provided.

Since stress resulting from a temperature change is exerted on the two surface acoustic wave resonators, stresses due to factors other than acceleration cancel each other out by differentially picking up the outputs of the two surface acoustic wave resonators. An acceleration sensor susceptible to acceleration only is thus provided.

Since the acceleration detection elements have a simple construction and routing the electrodes out is easy, a compact design is implemented. The acceleration detection element is thus structured into a surface-mounting component (a chip component).

The acceleration sensor of the present invention includes the bimorph type acceleration element composed of the two surface acoustic wave resonators. The two surface acoustic wave resonators are produced by arranging a pair of IDT electrodes on each of both sides of the single piezoelectric substrate. Tensile stress and compressive stress are reliably generated on the two surface of the acceleration detection element under acceleration. By differentially picking up the frequency change of the two resonators or the impedance change of the two resonators, a signal proportional to acceleration is obtained. A high detection-gain acceleration sensor is thus provided.

Since the acceleration detection element is formed of the single piezoelectric substrate, a compact and thin acceleration sensor results.

The acceleration sensor of the present invention includes the bimorph type acceleration detection element. This acceleration detection element includes the two surface acoustic wave resonators which are laminated together with the back surface of the one resonator bonded to the back surface of the other resonator. Each resonator is produced by arranging the IDT electrodes on the surface of the glass substrate and then, by depositing the piezoelectric film on the glass substrate having the IDT electrodes thereon. With this arrangement, the acceleration sensor provides high detection gain, and is free from the effect of temperature changes, and is susceptible to acceleration only.

Since the IDT electrodes are arranged on both sides of the single glass substrate, the acceleration sensor becomes even more compact and thinner.

What is claimed is:

1. An acceleration sensor comprising a bimorph type acceleration detection element including a pair of surface acoustic wave resonators coupled to each other with the back surface of one resonator bonded to the back surface of the other resonator, wherein each resonator includes a piezoelectric substrate and a pair of IDT electrodes which are arranged on the front surface of said piezoelectric substrate, wherein said acceleration detection element is supported at an end thereof such that said acceleration detection element is deflected in the thickness direction of the piezoelectric substrate under acceleration, and wherein acceleration is detected by differentially detecting a frequency change or an impedance change of said two surface acoustic wave resonators which is caused by the deflection of the acceleration detection element.

2. An acceleration sensor according to claim 1, comprising:

a pair of casing members respectively arranged on two opposed side surfaces of said acceleration detection element facing in a direction in which acceleration is applied, said each casing member having a recess in the portion thereof at least facing the IDT electrodes and bonded on both ends thereof; and a pair of covering members respectively bonded around the peripheral outline portions thereof to two open surfaces defined by said acceleration element and said casing members, wherein said IDT electrodes arranged on said two surface acoustic wave resonators are respectively connected to external electrodes arranged on the external surfaces of said covering members via electrodes arranged on the surfaces of said casing members.

3. An acceleration sensor according to claim 1, comprising a pair of casing members respectively arranged on two opposed side surfaces of said acceleration detection element facing in a direction in which acceleration is applied, said each casing member having a recess in the portion thereof at least facing the IDT electrodes and bonded on the entire peripheral outline portion thereof, wherein said IDT electrodes arranged on said two surface acoustic wave resonators are connected to terminal electrodes provided along side edges of said acceleration detection element, and said terminal electrodes are respectively connected to external electrodes arranged on the external surfaces of said casing members.

4. An acceleration sensor according to claim 1, wherein said two surface acoustic wave resonators are oscillated at different frequencies, a difference between the oscillated frequencies is detected, and a signal proportional to acceleration is determined from the frequency difference.

5. An acceleration sensor according to claim 1, wherein said two surface acoustic wave resonators are oscillated at the same frequency, one of a phase difference and an amplitude difference is obtained from a difference between electric impedances of said two resonators, and a signal proportional to acceleration is determined from one of the phase difference and the amplitude difference.

6. An acceleration sensor comprising a bimorph type acceleration detection element including a pair of surface acoustic wave resonators coupled to each other with the back surface of one resonator bonded to the back surface of the other resonator, wherein each resonator includes a glass substrate, a pair of IDT electrodes which are arranged on the front surface of said glass substrate, and a piezoelectric film which is deposited on said glass substrate including said IDT electrodes, wherein said acceleration detection element is supported at an end thereof such that said acceleration detection element is deflected in the thickness direction of the glass substrate under acceleration, and wherein acceleration is detected by differentially detecting a frequency change or an impedance change of said two surface acoustic wave resonators which is caused by the deflection of the acceleration detection element.

* * * * *